No. 836,930. PATENTED NOV. 27, 1906.
C. KLUG & J. HONNAUER.
HOSE COUPLING.
APPLICATION FILED JULY 8, 1905.
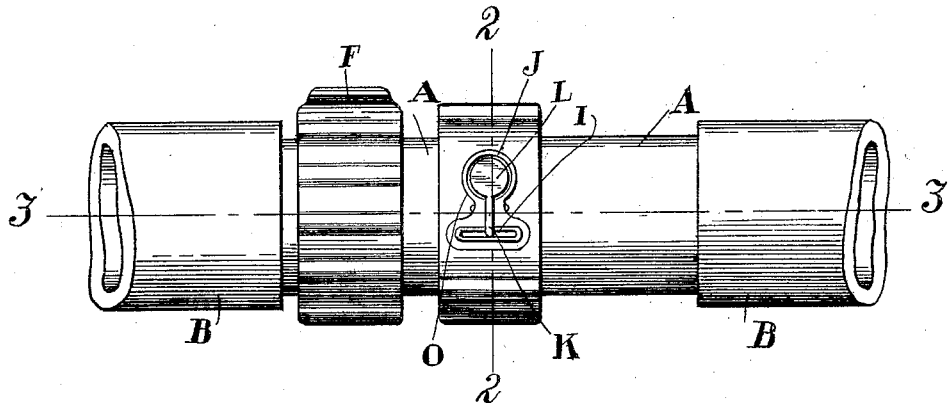
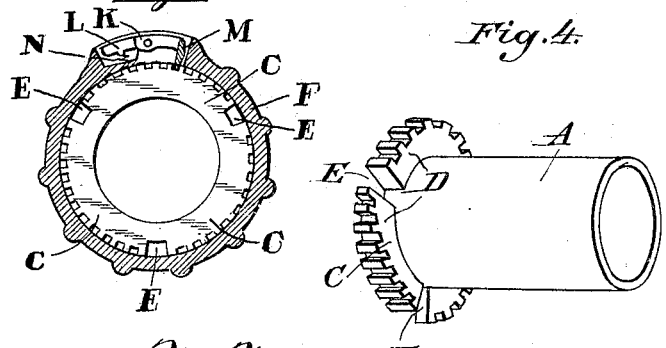
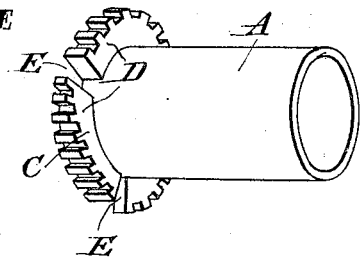
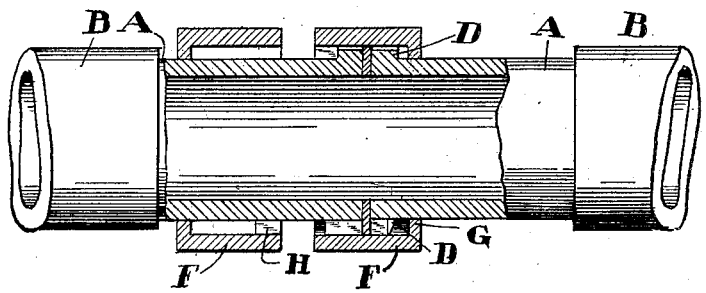
Witnesses
Inventors
Charles Klug
John Honnauer
By Rudolph ... Atty.
THE NORRIS PETERS CO., WASHINGTON, D.C.

UNITED STATES PATENT OFFICE.

CHARLES KLUG AND JOHN HONNAUER, OF CHICAGO, ILLINOIS.

HOSE-COUPLING.

No. 836,930.  Specification of Letters Patent.  Patented Nov. 27, 1906.

Application filed July 8, 1905. Serial No. 268,891.

*To all whom it may concern:*

Be it known that we, CHARLES KLUG and JOHN HONNAUER, subjects of the German Emperor, residing at Chicago, in the county of Cook and State of Illinois, have invented certain new and useful Improvements in Hose-Couplings; and we do hereby declare the following to be a full, clear, and exact description of the invention, such as will enable others skilled in the art to which it appertains to make and use the same.

Our invention relates to a novel construction in a hose-coupling, the object being to provide a device of this character which can be easily and rapidly coupled and in which the danger of accidental uncoupling is obviated, and, furthermore, to provide a device of this character which is suitable for use on cars for coupling the ends of air-brake hose and the like; and it consists in the features of construction and combinations of parts hereinafter fully described and claimed.

In the accompanying drawings, illustrating our invention, Figure 1 is a side elevation of a hose-coupling constructed in accordance with our invention. Fig. 2 is a transverse section of the same on the line 2 2 of Fig. 1. Fig. 3 is a longitudinal section of the same on the line 3 3 of Fig. 1. Figs. 4 and 5 are detail perspective views of two of the coupling members, respectively.

Referring now to said drawings, A indicates the members to be coupled and which are adapted to be secured to the ends of two sections B of hose. Each of said members A is provided externally at its free end with a plurality of peripheral projections C, each extending, preferably, through an arc greater than ninety degrees and having its rear face inclined to provide a plurality of inclined or wedge faces D. The outer edges of said projections are toothed, and between each two of said projections is a recess E. Movable longitudinally and revolubly on each of said members A is a sleeve F, provided at one end with an internal annular flange G and at its other end with inwardly-extending protections H, corresponding in number and relative location with said recesses E and adapted to pass through the latter and engage the wedge-faces D of said projections C of the adjacent member A, the said flange G being adapted to engage the projections C of the member on which said sleeve is mounted. Two of said sleeves are provided on said coupling, so that in the event that one should be out of order the other may be employed and, further, so that when used for coupling air-brake hose on cars the contingency of two sleeveless ends cannot be brought together at any time.

It is essential that the sleeves should be firmly held against reverse movement to prevent accidental uncoupling, and to this end we provide in each of said sleeves F a T-shaped slot I, one arm of which communicates with a circular recess J. A lever K, terminating at one end in a button L and having lateral arm M at its other end, is pivotally mounted between its ends in said slot, and a spiral compression-spring N is disposed underneath said button end in said recess to normally depress said lateral arm into engagement with the teeth on said projections, so as to lock said sleeve against rotation. The said lever is so disposed that all parts of same are substantially flush with the outer face of said sleeve, the latter being preferably provided with a flange O, surrounding said slot and recess, to provide sufficient thickness of metal to permit said lever to be made relatively strong and durable. Inasmuch as no part of said lever projects, the danger of accidental release of same from engagement with said teeth by accidental dropping is obviated. Slight pressure on the button and of said lever will, however, release the same from such engagement.

Our device is very simple and efficient.

To couple two hose-sections with each other, the free ends of the members A are placed in contact flush with each other, a washer being preferably inserted between the same. The recesses E of each member A are placed to register with each other, and one of said rings F is moved longitudinally, so that the projections H thereof pass through said recesses E. Said ring F is then turned relatively to said members A in one direction, whereupon said lugs or projections H will engage the rear inclined faces of projections C of one of said members A and force the said members toward each other. The lever K is meanwhile maintained in position, so that the arm M thereof is out of engagement with the teeth of said projections C, and when said ring has been turned as far as necessary said lever is released, thereby obviously locking said ring in position on said members A to maintain the same firmly coupled.

We claim as our invention—

A hose-coupling comprising two members adapted to be secured to the ends of hose-sections, and provided at their free ends with peripheral projections having inclined rear faces, there being a recess between each two of said projections, a sleeve longitudinally and revolubly mounted on each of said members, an inwardly-disposed annular flange on each of said sleeves at one end, inwardly-extending projections at its other end corresponding in number and location with said recesses, teeth on said peripheral projections of said members, each of said sleeves being provided with a T-shaped slot and a substantially circular recess communicating with one arm of said slot, a lever having a lateral projection at one end and terminating at its other end in a button, pivotally secured between its end in the said slot, and a spring disposed in said recess and engaging said button to normally hold said lateral arm depressed to engage said teeth of said projections.

In testimony whereof we have signed our names in presence of two subscribing witnesses.

CHARLES KLUG.
JOHN HONNAUER.

Witnesses:
RUDOLPH WM. LOTZ,
R. A. FISCHER.